3,345,375
3-LOWER ALKYL-5-(4-PYRIDYL)-ISOXAZOLE-4-CARBONYL DERIVATIVES

Richard Donovick, Bound Brook, Leon John Heuser, Princeton, and Morris Augustus Dolliver, Edison, N.J., assignors, by mesne assignments, to E. R. Squibb & Sons, Inc., New York, N.Y., a corporation of Delaware
No Drawing. Original application Mar. 25, 1963, Ser. No. 267,833, now Patent No. 3,249,601, dated Mar. 3, 1966. Divided and this application Aug. 12, 1965, Ser. No. 489,452
6 Claims. (Cl. 260—295)

This application is a division of application Serial No. 267,833, filed March 25, 1963, now U.S. Patent No. 3,249,601.

This invention relates to 3-lower alkyl-5-(pyridylisoxazol-4-yl)penicillin and to salts thereof. More particularly, the invention pertains to 3-lower alkyl-[5-(4-pyridyl)-isoxazol-4-yl]penicillin and especially 3-methyl-5-[(4-pyridyl)-isoxazol-4-yl]penicillin and to salts thereof with bases.

The substituent in the 3-position may be any lower alkyl group such as methyl, ethyl, propyl, isopropyl or the like, but methyl is preferred. The pyridyl group may be attached to the 5-position of the isoxazole ring in either the $\alpha$, $\beta$ or $\gamma$-position, but the $\gamma$-position is preferred.

The new products of this invention are produced by saponifying 3-lower alkyl-5-pyridylisoxazole-4-carboxylic acid alkyl ester to obtain 3-lower alkyl-5-pyridylisoxazole-4-carboxylic acid, converting the latter to the acid chloride, e.g., with thionyl chloride, and reacting the acid chloride with 6-aminopenicillanic acid.

The compounds of this invention form salts with inorganic and organic bases. Among the salts are the alkali metal salts, e.g., sodium and potassium salts, alkaline earth metal salts, e.g., magnesium and calcium salts, and amine salts, e.g., tertiary amine salts including for instance, the tri(lower alkyl)amines such as trimethylamine and triethylamine salts, and heterocyclic amines such as N-methylpiperidine, N-methylmorpholine and N,N-dibenzylethylenediamine.

The new compounds of this invention are physiologically active substances having a high degree of antibacterial activity and may be used to combat infections due to Gram positive and Gram negative microorganisms such as *Staphylococcus aureus, Streptococcus pyogenes, Diplococcus pneumoniae, Neisseria gonorrhaeas, Neisseria meningitidis,* and *Treponema pallidum*. They may be administered orally or parenterally in the form of tablets, capsules, elixirs, injectables or the like by incorporating the appropriate doses of the base or a physiologically acceptable salt thereof in a conventional vehicle in the same manner as penicillin G or penicillin V, for example.

The following examples are illustrative of the invention. All temperatures are on the centigrade scale.

EXAMPLE 1
*Preparation of 3-methyl-5-($\gamma$-pyridyl)-isoxazole-4-carboxylic acid ethyl ester*

To a mixture of 10 g. sodium hydride-mineral oil suspension (approximately 50% sodium hydride) and 600 ml. dry benzene are added with stirring 32 g. ethyl acetoacetate over a period of 24 minutes. During the addition, the temperature of the reaction mixture is maintained at 22–29°. Next a solution of 31 g. isonicotinyl chloride in 100 ml. benzene is added dropwise over a period of 34 minutes. Stirring is then continued for 40 minutes. The solvent is then removed by distillation leaving a residue of 30.3 g. which is taken up in a mixture of 75 ml. methanol and 20 ml. water. This solution is treated with 19 g. hydroxylamine hydrochloride and stirred for 8 hours at 35–40°. The reaction mixture is diluted with 150 ml. water and neutralized with a solution of sodium bicarbonate. The product separates as a flocculent precipitate which is recrystallized from dilute methanol to yield 9.31 g., M.P. 101–102°.

*Analysis.*—Calc. for $C_{12}H_{12}N_2O_3$: C, 61.8; H, 5.14; N, 12.01. Found: C, 61.7; H, 5.41; N, 12.13.

EXAMPLE 2
*Preparation of 3-methyl-5-($\gamma$-pyridyl)-isoxazole-4-carboxylic acid*

1 g. of the ethyl ester prepared as above is saponified by refluxing with a mixture of 5 ml. 10% sodium hydroxide and 25 ml. methanol for 8 hours. The reaction mixture is cooled and acidified to pH 3.2 with dilute hydrochloric acid. The precipitated product is recrystallized for 60% methanol to yield 0.58 g., M.P. 256–257°.

*Analysis.*—Calc. for $C_{10}H_8O_3N_2$: C, 58.73; H, 3.92; N, 13.72. Found: C, 58.90; H, 4.22; N, 13.58.

EXAMPLE 3
*Preparation of 3-methyl-5-($\gamma$-pyridyl)isoxazole-4-carbonylchloride*

2 g. of the acid prepared as above are refluxed 4 hours with 25 ml. thionyl chloride. The excess thionyl chloride is then removed by distillation and the residue washed with benzene to yield 1.8 g. of solid, M.P. 194–198°.

*Analysis.*—Calc. for $C_{10}H_8Cl_2N_2O_2$: Cl, 27.41; N, 10.81. Found: Cl, 27.43; N, 10.61.

EXAMPLE 4
*Preparation of 3-methyl-5-(4-pyridylisoxazol-4-yl) penicillin*

2 g. of 6-aminopenicillanic acid are slurried in a mixture of 30 ml. water and 10 ml. acetone. Neutralization to pH 7.0–7.5 with 10% KOH gives a clear solution. A slurry of 2.4 g. 3-methyl-5-pyridylisoxazole-4-carbonyl chloride hydrochloride in 20 ml. acetone is then added in small increments at room temperature, using additional KOH solution to maintain the pH.

After 4 hours agitation at room temperature, 80 ml. butanol are added and the mixture azeotropically distilled under vacuum to remove the acetone and water present. 2.7 g. by-product material precipitates and is removed by filtration.

The mother liquid is concentrated under vacuum to about 10 ml. and 60 ml. acetone are added. After standing in the cold for 2 hours, the amorphous precipitate is filtered and dried. 460 mg. of the potassium salt of 3-methyl-5-(4-pyridylisoxazol-4-yl)penicillin are obtained in 85–90% purity according to the iodometric and hydroxylamine assay procedures for penicillins.

Neutralization with hydrochloric acid gives 3-methyl-5-(4-pyridylisoxazol-4-yl)penicillin.

What is claimed is:
1. 3-lower alkyl - 5 - ($\gamma$ - pyridyl)isoxazole-4-carboxylic acid lower alkyl ester.
2. 3-methyl-5-($\gamma$-pyridyl)isoxazole - 4 - carboxylic acid ethyl ester.
3. 3-lower alkyl - 5 - ($\gamma$-pyridyl)isoxazole-4-carboxylic acid.
4. 3-methyl-5-($\gamma$-pyridyl)isoxazole-4-carboxylic acid.
5. 3-lower alkyl-5-($\gamma$-pyridyl)isoxazole-4-carbonyl chloride.
6. 3-methyl-5-($\gamma$-pyridyl)isoxazole-4-carbonyl chloride.

References Cited
UNITED STATES PATENTS
3,277,105  10/1966  Schmidt et al. _____ 260—295

WALTER A. MODANCE, *Primary Examiner.*
A. ROTMAN, *Assistant Examiner.*